(12) United States Patent
Stokes et al.

(10) Patent No.: US 8,885,058 B2
(45) Date of Patent: Nov. 11, 2014

(54) AUTOMATIC LOW NOISE SAMPLING OF IMAGE AND TIMING SIGNALS AND SIGNAL DELAY COMPENSATION

(71) Applicants: Randal E. Stokes, Goleta, CA (US);
Patrick Walp, Santa Barbara, CA (US);
Ralph Fuquay, Santa Barbara, CA (US)

(72) Inventors: Randal E. Stokes, Goleta, CA (US);
Patrick Walp, Santa Barbara, CA (US);
Ralph Fuquay, Santa Barbara, CA (US)

(73) Assignee: Karl Storz Imaging, Inc., Goleta, CA (US)

( * ) Notice: Subject to any disclaimer, the term of this patent is extended or adjusted under 35 U.S.C. 154(b) by 133 days.

(21) Appl. No.: 13/731,355

(22) Filed: Dec. 31, 2012

(65) Prior Publication Data
US 2014/0184857 A1 Jul. 3, 2014

(51) Int. Cl.
*H04N 5/232* (2006.01)
*H04N 5/335* (2011.01)
*H03M 5/00* (2006.01)
*H04N 5/217* (2011.01)

(52) U.S. Cl.
CPC .................................... *H04N 5/217* (2013.01)
USPC ........................ 348/211.9; 348/312; 341/155

(58) Field of Classification Search
CPC .. H04N 5/232; H04N 5/23203; H04N 5/2259;
H04N 5/23206; H04N 5/2628; H04N 5/335;
H04N 5/372; H04N 5/3765; H04N 3/155;
H04N 3/1575
USPC ............................... 348/211.9, 312; 341/551
See application file for complete search history.

(56) References Cited

U.S. PATENT DOCUMENTS

| 4,484,555 | A | 11/1984 | Miura |
| 4,845,555 | A | 7/1989 | Yabe et al. |
| 4,860,095 | A | 8/1989 | Kimura et al. |
| 5,434,615 | A | 7/1995 | Matumoto |
| 5,585,840 | A | 12/1996 | Watanabe et al. |
| 5,696,553 | A | 12/1997 | D'Alfonso et al. |
| 5,805,202 | A | 9/1998 | Mullins et al. |
| 5,903,308 | A | 5/1999 | Cooper et al. |
| 5,913,817 | A | 6/1999 | Lee |
| 6,449,007 | B1 | 9/2002 | Yokoyama |
| 7,365,768 | B1 | 4/2008 | Ono et al. |
| 7,466,344 | B2 | 12/2008 | Bleau et al. |
| 7,551,196 | B2 | 6/2009 | Ono et al. |
| 7,667,746 | B2 | 2/2010 | Myers et al. |
| 8,199,187 | B2 | 6/2012 | Knapp, II et al. |
| 8,212,863 | B2 | 7/2012 | Tanaka et al. |
| 8,284,285 | B2 * | 10/2012 | Takahashi ..................... 348/302 |
| 8,471,896 | B2 * | 6/2013 | Chiba et al. ..................... 348/47 |
| 8,659,646 | B2 * | 2/2014 | Adler et al. ..................... 348/65 |

OTHER PUBLICATIONS

Analog Devices—AS9979 Product Description (c) 2007-2009 Analog Devices, Inc. All rights reserved; www.analog.com; 56 pages.

(Continued)

*Primary Examiner* — Twyler Haskins
*Assistant Examiner* — Quang Le
(74) *Attorney, Agent, or Firm* — St. Onge Steward Johnston & Reens LLC (57) ABSTRACT

A system is provided that measures the delay time of a first timing signal transmitted from a control unit to an imager and back to a phase detector. The phase detector also receives a second timing signal that is used as a reference to measure against the received/delayed first timing signal. Based on the phase detection, the system will retard or advance the first timing signal to compensate for the phase shift.

39 Claims, 6 Drawing Sheets

(56) References Cited

OTHER PUBLICATIONS

Xilinx (R)—DS150 (v2.4) Videx-6 Family Overview; Product Specification; www.xilinx.com; Jan. 19, 2012; 11 pages.
Fairchild Semiconductor (TM)—NC7SZ175—TinyLogic(R) UHS D-Type Flip-Flop With Asynchronous Clear; (c) 2004 Fairchild Semiconductor Corporation; www.faitchildsemi.com; May 1998 (revised Aug. 2004); 9 pages.

OR 1 (R) Essential Drawings Drawn by: SS Dated: Sep. 9, 2008 13 pages.

OR1(R) Essential—Instruction Manual; (c) 2009 Karl Storz Endoscopy-America, Inc.; 36 pages.

Silicon Labs—Si570/Si571; Product Description; Copyright (c) 2011 by Silicon Laboratories; 32 pages.

* cited by examiner

AUTOMATIC LOW NOISE SAMPLING OF IMAGE AND TIMING SIGNALS AND SIGNAL DELAY COMPENSATION

FIELD OF THE INVENTION

The invention relates to a system and method for reducing timing noise in a video imaging system, and more particularly for reducing distortion caused by signal transmission line mechanics of design and/or overall signal transmission line propagation delay.

BACKGROUND OF THE INVENTION

Endoscopes are well known and widely used in the medical field. In general terms, endoscopes are grouped into two general categories, rigid or flexible. Typically, rigid endoscopes comprise an elongated shaft housing an optical system which conveys light energy from a distal end of the shaft to an ocular positioned at the proximal end of the shaft. At times, medical practitioners directly view the inside of a body cavity via the endoscope ocular. In recent years, however, a handheld camera is detachably affixed to the endoscope to generate and transmit images representative of the endoscope field of view to a surgical display or monitor. Typically, the camera (e.g., a "camera head") includes a solid-state image sensor which converts detected light energy into electronic signals.

Additionally, some endoscopes are provided with integrated imagers which obviate the need for a separate camera head. Endoscopes with integrated imagers (both rigid and flexible) are generally referred to as "video endoscopes". Video endoscopes, as are those endoscopes with detachable camera heads, are typically either wired or wirelessly in communication with a Camera Control Unit ("CCU"). CCU's receive, from the camera head or video endoscope, the electronic signals representative of the endoscope field of view.

As with both camera heads and video endoscopes, the electrical distance between the image sensor and any associated supporting timing generator can vary greatly, depending upon the overall design of the video system. Therefore, the length of certain signal transmission lines extending from the image sensor or from the CCU, may vary depending on the type of video endoscope and/or camera head utilized. As signal transmission lines increase in length, certain timing signals may be distorted due to limitations of the signal conductor and/or by propagation delay. This undesired timing signal corruption may, in turn, produce inaccuracies and/or corruption to the resulting displayed video.

The degree of image signal deterioration/corruption caused by signal transmission line mechanics of design and/or overall signal transmission line propagation delay is proportionally related to the length of the transmission line. There are many types of endoscopes for respective applications and the lengths of the cables can vary from approximately half a meter to several meters in length (i.e., the endoscope insertion sections as well as cables for connecting the endoscope to the CCU).

One approach to deal with this problem is to have a dedicated CCU for each respective endoscope. However, this approach is just not economical nor is it practical in terms of space-saving or time if an endoscope needs to be changed during a medical procedure. Instead, a single CCU is commonly used to support a plurality of endoscopes. As cable length increases, the amplitude, DC level and phase of image sensor timing signals, which are supplied from the CCU to the image sensor via the cable, as well as amplitude and phase of the image signal transmitted from the image sensor to the CCU also via the cable, vary with different types of endoscopes. This timing and image signal variance may become so great that it becomes extremely difficult, if not impossible, to process the image signal for presentation to the display.

In order to solve these problems, some video systems have provided a cable/head delay circuit that directly uses a signal that makes a cable/head round trip. These cable/head delay circuits are used for adjusting the timing and/or image signal(s) depending on the type of the endoscope used. However, these cable/head delay circuits, are typically complicated in design and configuration, and exhibit reduced reliability. On the other hand, if a cable/head delay circuit is housed within the endoscope(s), a plurality of design configurations must be provided for various types of endoscopes, thus entailing an increase in component numbers required in the system. Additionally, such circuitry takes up valuable space and energy in the endoscope, and adds to the overall weight of the device, which is highly undesirable for a surgeon that has to hold the endoscope for many hours during a surgical procedure.

U.S. Pat. No. 4,860,095, Kimura et al. describes a system that utilizes an analog cable/head delay circuit. Kimura et al. teaches that image sensor driving signals are generated in the control and video processing circuitry and passed to the image sensor (CCD) by means of the cable. To deal with the decay in these signals that would otherwise occur in the cable, circuitry is provided to appropriately adjust the amplitude of the driving signals before the same are sent over the cable. To adjust for the delay of these signals, a Phase-Locked Loop (PLL) is provided to continuously maintain a constant phase relationship between the driving signals, and the composite signal. In other words, Kimura et al. teaches that timing is achieved by using a signal that has made the cable/head round trip in a PLL. However, this approach suffers from well-known instability that plagues classic PLL's. This design is also extremely complex because of the large number of signal lines in the cable and the level of circuitry required for transmitting the driving signals to the CCD.

A major problem with prior art approaches has been the introduction of an analog delay line that introduces jitter (timing noise) to the signal. This jitter is unavoidably translated to voltage noise during the analog-to-digital conversion. Voltage noise, in turn, is seen as visible noise in the viewed image resulting in a corrupted image.

SUMMARY OF THE INVENTION

Accordingly, what is desired then, is a system and method that reduces distortions caused by changes in the amplitude, DC level and phase of image sensor timing signals supplied to the image sensor.

It is also desired to provide a system and method that reduces distortions caused by changes in the amplitude and phase of an image signal transmitted from the image sensor to a CCU.

It is further desired to provide a system and method that reduces video image signal distortion caused by signal transmission line mechanics of design and/or overall signal transmission line propagation delay.

These and other objects are achieved in one embodiment by the provision of a high precision, low noise master clock positioned adjacent (in the immediate vicinity) to the Analog Front End (AFE)/Analog-to-Digital Converter (ADC), which in turn has high precision, high speed programmable clocks which facilitate precise timing for sampling an analog video waveform. In other words, sample timing in known systems is performed relative to a signal that has made a cable/head round trip and/or by use of delay lines. These known techniques inherently introduce jitter and inaccuracies. Instead of using the delayed (and hence jittery) signal directly, the system instead adjusts a highly stable timing generator in the AFE to compensate for cable/head signal delay.

Some of the advantages over known systems include: 1) the stable timing generator is programmable so as to provide highly precise and adjustable sample timing to compensate for cable length and circuit variations (temperature, unit-to-unit differences, component degradation) within a feedback loop; and 2) sample timing adjustment is accomplished without analog delay lines avoiding the inherent introduction of jitter (timing noise).

An important benefit of the present system is the marked ability to reduce image noise, which is achieved by improving control over the sample timing: the location, location tolerance, and jitter. The problem with known systems is that any jitter or uncertainty acquired in the signal's round trip is translated to noise and inaccuracy in the digitized video. Likewise, if analog delay lines are used to set the sample timing, then additional jitter in the delay is acquired. Use of digital delay lines can reduce this problem, but cannot eliminate it, or reduce it to acceptable levels. Accordingly, the sample timing of the present system does not directly introduce a signal that has made a cable/head round trip into the timing signal, nor is the sample timing of the present system determined by delay lines of any sort. Rather, cable/head delay is measured by the present system by use of a phase detection circuit. However, rather than using that delayed (jittery) signal directly, a programmable, high speed, high precision timing generator is adjusted to compensate for the timing signal delay.

An Automatic Signal Delay Compensation ("ASDC") circuit/module is provided that allows a processor to access internal registers of an AFE so as to utilize a programmable timing driver. In one configuration, the timing driver can provide high-speed clocks with approximately 240 ps resolution at 65 MHz operation.

The ASDC module typically includes four main parts: a bus interface, a command storage FIFO, an ADC serial transmitter, and a pixel-sync adjustment algorithm.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The terms "process" and "processing" as used herein each mean an action or a series of actions including, for example, but not limited to, the continuous or non-continuous, synchronous or asynchronous, direction of data, modification of data, formatting and/or conversion of data, tagging or annotation of data, measurement, comparison and/or review of data, and may or may not comprise a program.

In one advantageous embodiment, an imaging system is provided comprising, an imager generating image data and a control unit connected to the imager. The control unit includes, a timing generator generating a timing signal, a video processor for processing the image data, and a signal delay compensation circuit. The signal delay compensation circuit includes, an analog front end circuit generating a first timing signal and a second timing signal where the first and second timing signals each have either a high signal state or a low signal state, and where the first timing signal is sent to the imager and the image data is transmitted to the analog front end circuit. The signal delay compensation circuit also includes, a phase detection circuit coupled to the analog front end circuit and receiving the first and second timing signals. The system is provided such that, the phase detection circuit is coupled to the imager and receives the first timing signal transmitted from the imager, and the phase detection circuit makes a plurality of comparisons between a signal state of the first timing signal received from the imager to a signal state of the second timing signal. The system is further provided such that, if the signal state of the first timing signal lags (is retarded) in phase relative to the signal state of the second timing signal, then the output of the phase detection circuit will be "high" during the plurality of comparisons. If the signal state of the first timing signal leads (is advanced) in phase relative to the signal state of the second timing signal, then the output of the phase detection circuit will be "low" during the plurality of comparisons. The system is still further provided such that, if during the plurality of comparisons the phase detection circuit output changes signal state, that is the output toggles from one state to another state, then the signal state of the first timing signal is nearly identical in phase to the signal state of the second timing signal, and the system does not modify the phase of the first timing signal.

In another advantageous embodiment an imaging system is provided comprising, an imager generating image data, and a control unit connected to said imager. The control unit includes a signal delay compensation circuit having an analog front end circuit generating a first timing signal and a second timing signal where the first and second timing signals each have either a high signal state or a low signal state, the first timing signal sent to said imager and the image data transmitted to the analog front end circuit. The control unit further includes a phase detection circuit coupled to the analog front end circuit and receiving the second timing signal, which serves as a reference signal. The system is provided such that the phase detection circuit is coupled to the imager and receives the first timing signal transmitted from the imager, and the phase detection circuit makes a plurality of comparisons between a signal state of the first timing signal received from the imager to a signal state of the second timing signal. The system is provided such that if the signal state of the first timing signal is out of phase relative to the second timing signal during the plurality of comparisons, the signal delay timing circuit modifies the phase of one of either the first timing signal or the second timing signal by retarding or advancing the signal phase of either the first or the second timing signal. The system is further provided such that if the output signal state of the phase detector alternates between high and low, the signal delay compensation circuit does not modify the phase of either the first timing signal or the second timing signal.

In still another advantageous embodiment a method for generating image data with an imaging system is provided comprising the steps of generating image data with an imager, connecting the imager to a control unit having a signal delay compensation circuit including an analog front end circuit and a phase detection circuit, and generating a first timing signal with the analog front end circuit. The method further comprises the steps of transmitting the first timing signal from the analog front end circuit to the imager, transmitting the first timing signal from the imager to the phase detection circuit, and generating a second timing signal with the analog front end circuit. The method still further comprises the steps of transmitting the second timing signal from the analog front end circuit to the phase detection circuit, the second timing signal serving as a reference signal, and performing a plurality of comparisons of a phase relationship of the first timing signal to the second timing signal. The method is provided such that if the signal state of the first timing signal is always high or always low relative to the second timing signal during the plurality of comparisons, the method further comprises the steps of retarding or advancing the signal phase of either the first timing signal or the second timing signal. Additionally, the method is provided such that if the output signal state of the phase detector alternates between high and low during the plurality of comparisons, neither the first timing signal nor the second timing signal is retarded or advanced.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
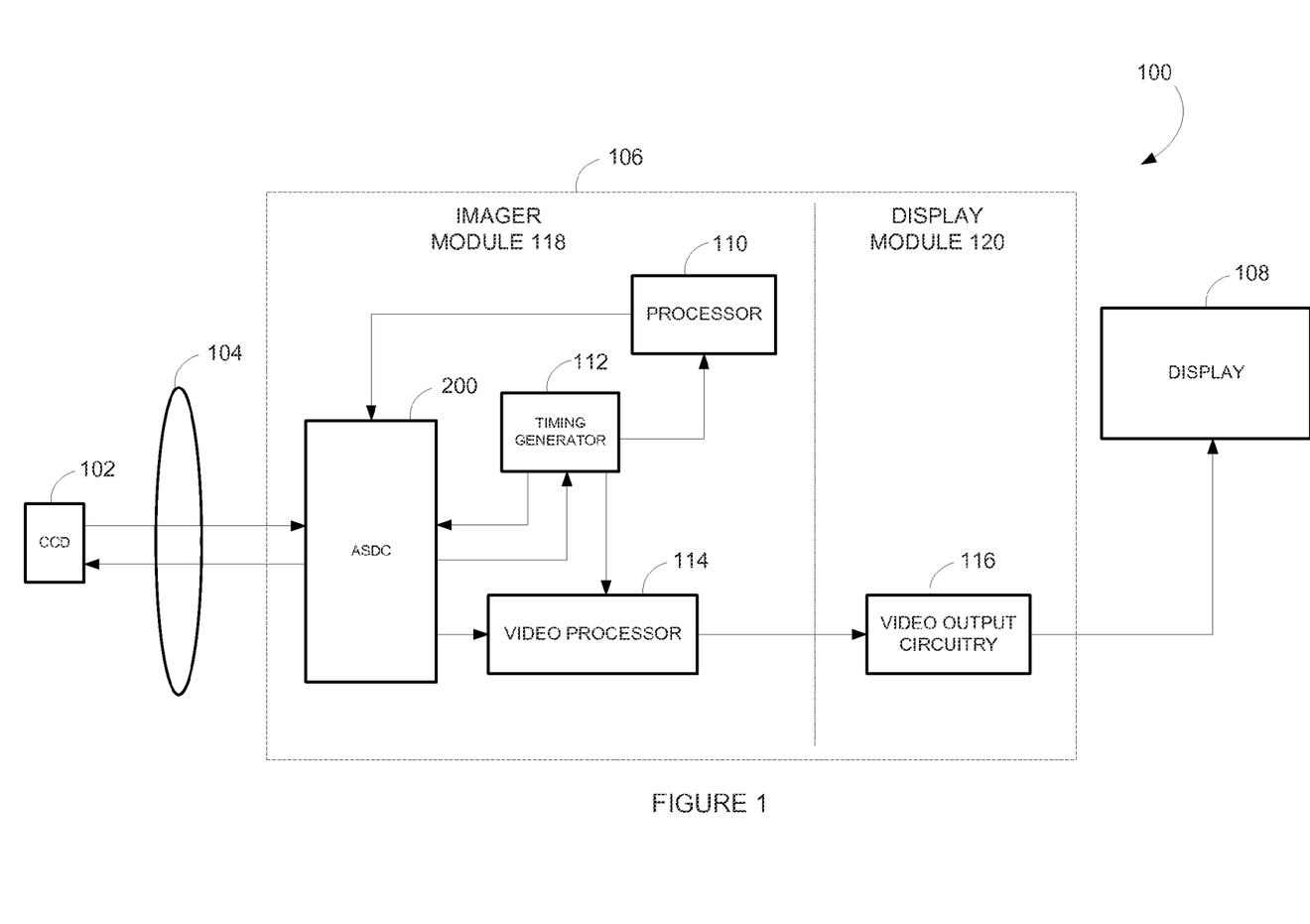
FIG. 1 is a block diagram of one advantageous embodiment of the present invention.

Referring now to FIG. 1 an advantageous embodiment of the system 100 that provides for automatic low noise sampling of image and timing signals and signal delay compensation. The system typically comprises an imager 102, which may, in one embodiment comprise a charge-coupled device (CCD) or a complimentary metal-oxide-semiconductor (CMOS) device. The imager is detachably connected via a cable 104 to a control unit 106, which is typically referred to as a camera control unit (CCU). The CCU 106 may comprise both an imager (or camera) module 118 and a display module 120, which may be detachably connectable to each other. Finally, a display 108 is connected to the CCU 106 on which image data generated by imager 102 and processed by CCU 106 is presented.

The imager module 118 is shown including four components: a processor 110, a timing generator 112, a video processor 114 and an automatic signal delay compensation (ASDC) circuit 200.

The timing generator 112 may comprise any typical and commercially available timing generator that is used to provide reference signals for the various devices illustrated in FIG. 1.

The video processor 114 may also comprise any typical and commercially available processor for processing digital image data. In one advantageous embodiment, the video processor may comprise, but is not limited to, a digital signal processor, a field programmable gate array (FPGA), a computer programmable logic device, a microprocessor, a microcontroller and the like. These are just some of the many devices that may be selected and one of skill in the art will understand that many differing types of devices may effectively be used alone or in conjunction with the other. The video processor is designed to receive and process digital image data, which, in turn, is sent to the display module 120 that includes video output circuitry 116 for further processing the image data for presentation on the display 108.

Still further, ASDC circuit 200 is shown receiving the timing generator signal from timing generator 112. In addition, ASDC 200 transmits a timing signal to the imager 102, along with various other control and/or command signals, and receives the image data from the imager 102. The image data is processed and transmitted to the video processor for further processing.

The processor 110 may comprise virtually any type of processor that provides for the writing of data to the ASDC circuit 200. Some of the data written to the ASDC circuit 200 may comprise, but is not limited to, an adjustment of timing devices in ASDC circuit 200 based upon an identification of the type of device imager 102 comprises. For example, imager 102 may comprise a CCD or a CMOS device, may comprise a high definition or a standard definition device, with various aspect ratios, etc. Various types of imagers may require different timing signals. Accordingly, processor 110 may provide data to ASDC circuit 200 to adjust a timing of the system based on an identification of imager 102.

Figure 2:
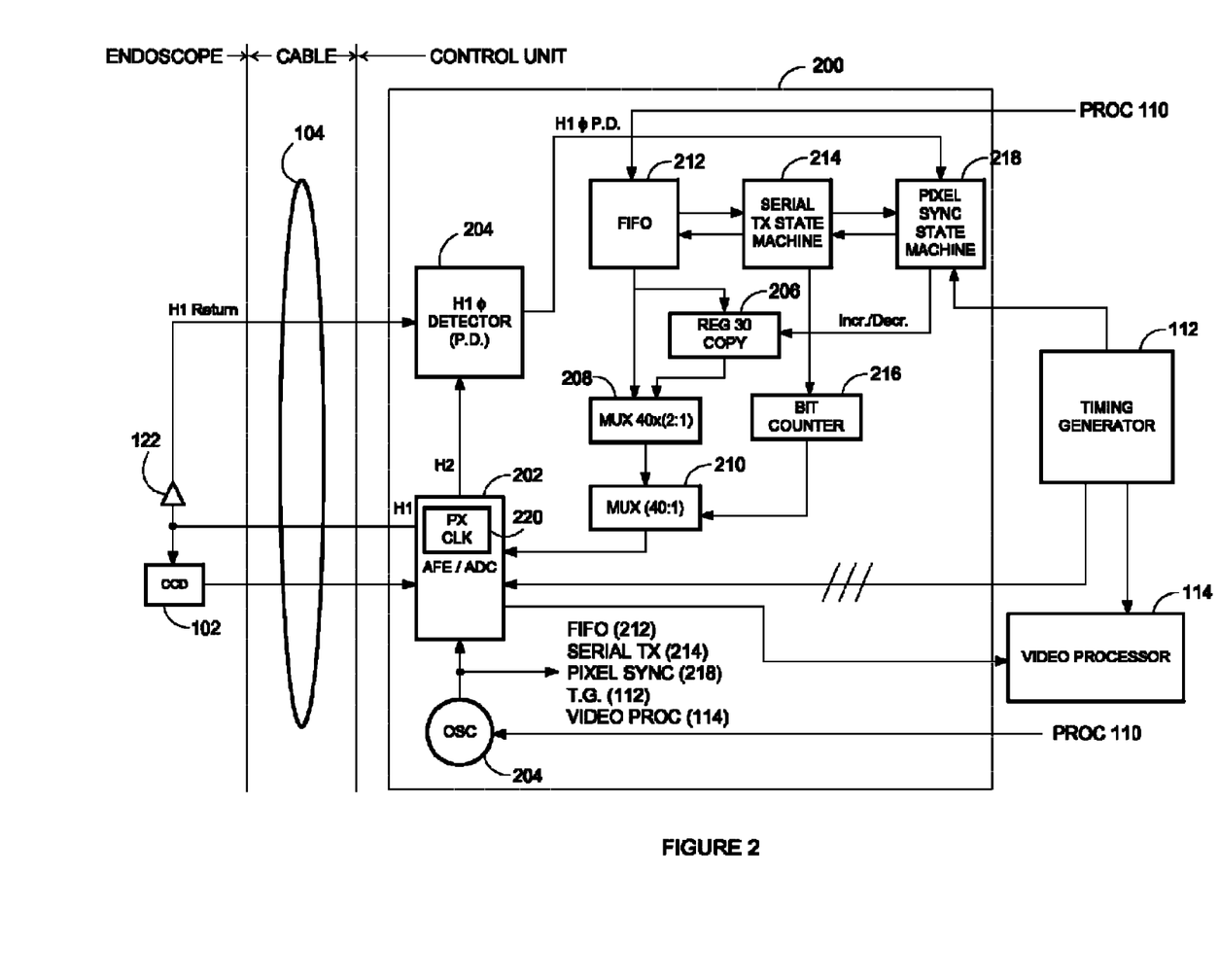
FIG. 2 is a block diagram according to FIG. 1.

Referring now to FIG. 2, ASDC circuit 200 is show in more detail. In this embodiment, the ASDC circuit 200 includes an analog front end/analog-to-digital converter (AFE/ADC) 202. AFE/ADC 202 may, in one embodiment, include internal registers that may be accessed and written to in order to adjust the operation of AFE/ADC 202. Access to the internal registers of AFE/ADC 202 may be provided by means of a unidirectional three-wire Serial Peripheral Interface (SPI) illustrated by the three diagonal lines in the line extending from the timing generator 112 to the AFE/ADC 202. This provides the advantage of being able to utilize an integral precision programmable timing driver in AFE/ADC 202. For example, AFE/ADC 202 may comprise a 14-Bit CCD Signal Processor with Precision Timing Core manufactured by Analog Devices, Inc. part number AD9979. This particular device provides a high-speed clock with approximately 240 ps resolution at 65 MHz operation. It should be understood that devices with different pixel rates may be used depending on, for example, the device requirements including, high-resolution/standard-resolution and PAL/NTSC formats. The highest frequency is approximately 14.3 MHz. Therefore, the system resolution is, in one embodiment, $\frac{1}{64}$th of the pixel period, e.g., $1/(64 \times 14.3 \text{ MHz}) = 1.09$ ns.

In one advantageous embodiment, the system utilizes a "low jitter" clock (e.g. an oscillator having <1 psec jitter). Jitter produces image noise if the analog sensor signal waveform is not perfectly flat (constant voltage) over the time when samples can occur. It is the interaction of jitter and the waveform that produces noise. Therefore reduced jitter enables a design tradeoff. Obtaining a smooth waveform at the sampling input can be difficult to achieve, therefore, less jitter allows a less-than-perfect waveform to be acceptable, thereby saving development time and cost. Depending on the measures that might otherwise be taken to make a more perfect waveform, production cost could also be reduced.

It should be noted that while various components in FIG. 2 are illustrated separate from, for example, video processor 114, it is contemplated that some or all of the various components shown in FIG. 2 and video processor 114 may reside on the same chip or chip set, and may comprise, for example, a single FPGA. However, the various components and the video processor 114 are illustrated separated from each other in FIG. 2 in order to explain and illustrate the function of the various circuit elements but are not intended to limit the structural configuration of the various elements.

Also illustrated in FIG. 2 are phase detector 204, a bus interface (collectively, register copy-30 206, multiplexer 40× (2:1) 208, and multiplexer (40:1) 210), a command storage FIFO 212, a serial transmit state machine/device 214 (with an associated bit counter 216), and pixel sync state machine/device 218. In one advantageous embodiment, all of: the bus interface, command storage FIFO 212, serial transmit state machine/device 214, pixel sync state machine/device 218, and video processor 114 are physically positioned on a single chip or device (such as an FPGA).

Phase Detector.

The H1 phase detector (pd) 204 is coupled to imager 102 and AFE/ADC 202. Phase detector 204 receives an H2 input, which serves as a reference timing signal, and receives an H1 input that has been transmitted to imager 102, and is retransmitted via logic buffer 122 back to phase detector 204. Phase detector 204 further includes an output (labeled H1 φ phase detector) that is input into pixel sync state machine/device 218. In one advantageous embodiment, phase detector 204 is embodied as an FPGA. However, it should be understood that phase detector 204 may comprise virtually any type of electronic device and may be a standalone device or integrated into a device with any of the other components illustrated in the Figures.

Bus Interface.

The bus interface (collectively, FIFO 212, reg-30-copy 206, multiplexer 40×(2:1) 208, and multiplexer (40:1) 210) allows software to access the AFE/ADC 202 internal registers. There are three software registers that the bus interface writes to for access to a single register in the AFE/ADC 202. The first register is an ADC Serial Transmission Address Register. This register is assigned the address of the register in the AFE/ADC 202 to be accessed. The last two registers involved with accessing the internal registers of the AFE/ADC 202 are the data registers. The data sent to the AFE/ADC 202 is 28 bits long. To accommodate this, there are two registers assigned to recording the data portion of a command. The AFE/ADC Serial Transmission Data MSB Register captures the MSB portion of the command data. The upper 12 bits of the transmission data are stored in the lower 12 bits of this register. The other register, AFE/ADC Serial Transmission Data LSB Register, contains the lower 16 bits of the command data. When the AFE/ADC Serial Transmission Data LSB Register is written to, all of the information in all four of these registers will be captured as a complete transmission command and sent to the FIFO 212 for further processing.

There are three more software-accessible registers for control and status of the pixel sync state machine/device 218. The first has a single bit enable/disable the pixel sync (also known as H1 sync, for the name of the pixel clock). The second is a copy of whatever software last wrote to the register within the ADC utilized to adjust H1 phase, as modified by the pixel sync state machine/device 218. The third is a diagnostic register indicating the number of times the pixel sync state machine/device 218 has not completed in a reasonable amount of time.

Command Storage FIFO.

Figure 6:
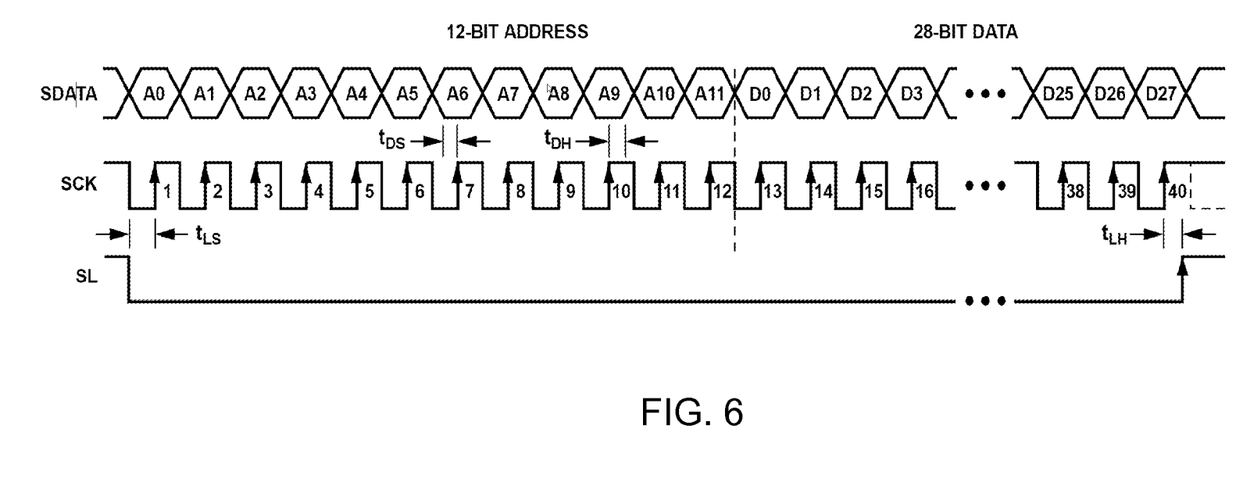
FIG. 6 is a signal diagram showing 40-bit sized commands including 12 bits for the address and 28 bits for the data.

The ADC Transmission Command Storage FIFO 212 is an asynchronous FIFO that stores transmission commands from the bus prior to being transmitted. It holds 40-bit sized commands (it may, in one embodiment, comprise 12 bits for the address, 28 bits for the data and have a depth of 32 commands) as shown in FIG. 6. After the ADC Serial Transmission Data LSB Register has been written to, all of the transmission components are collected from the appropriate registers and sent to FIFO 212 with an accompanying valid signal. When the transmission portion of this module is available and the FIFO 212 is not empty, the next transmission is pulled from FIFO 212.

Serial Transmit State Machine.

The serial transmitter 214 is a state machine responsible for serializing the 40-bit data as depicted in FIG. 6, either from the FIFO 212 or from the register reg-30-copy 206. It also may provide a serial clock and data-valid signals for a complete unidirectional three-wire SPI interface. It is understood that data-valid is often known as CS (chip-select) and sometimes also as SL (select).

As shown in FIG. 6, SData bits are latched on SCK rising edges, SCK may idle High or Low between write operations. All 40 bits are written: 12 bits for address and 28 bits for data. If the register length is <28 bits, then zeros are used to complete the 28-bit data length. New data values are updated in the specified register location at different times, depending on the particular register written to.

Pixel Sync State Machine.

The pixel sync state machine/device 218 monitors the output of the H1 phase detector (pd) and adjusts the phase of the H1 clock sent to imager 102 by writing to a register in the AFE/ADC 202. This provides a closed-loop adjustment of the pixel clock 220 phase sent to imager 102, thus adjusting the pixel clock (H1) phase to accommodate for differing transmission line lengths.

A signal from the timing generator—run_h1_adjust—is active from line three to line six inclusive of the video signal. The pixel sync state machine/device 218 runs during the non-horizontally-blanked portions of these four lines, however, it should be understood that additional lines or fewer lines may be utilized as desired. These particular lines are selected as they are vertically blanked in all four video modes, in case making a pixel clock (H1) phase adjustment may have visible effects when executed during active video. Accordingly, in one advantageous embodiment, the pixel sync state machine/device 218 only runs during the non-horizontally-blanked portions of the lines in order to avoid any possible gaps in the H1 clock which can occur during horizontal blanking.

Theory of Operation.

Figure 3:
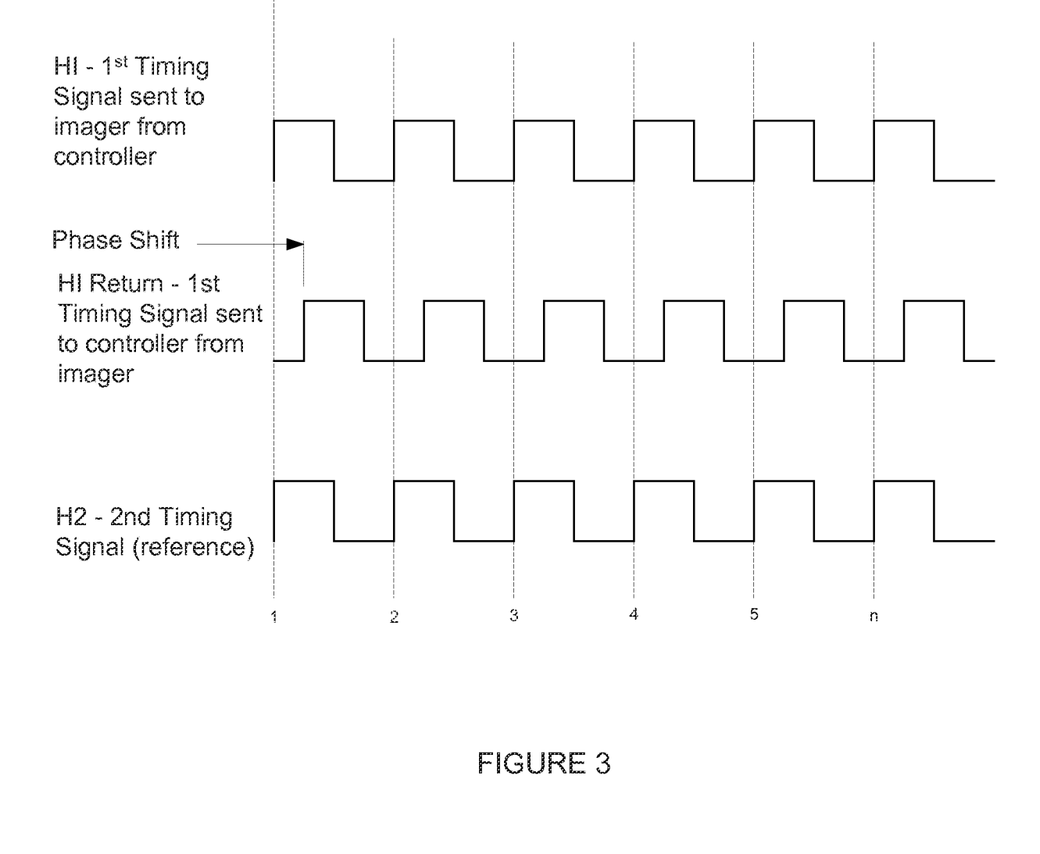
FIG. 3 is a graph of timing signal phase relationships according to the system illustrated in FIG. 2.
Figure 4:
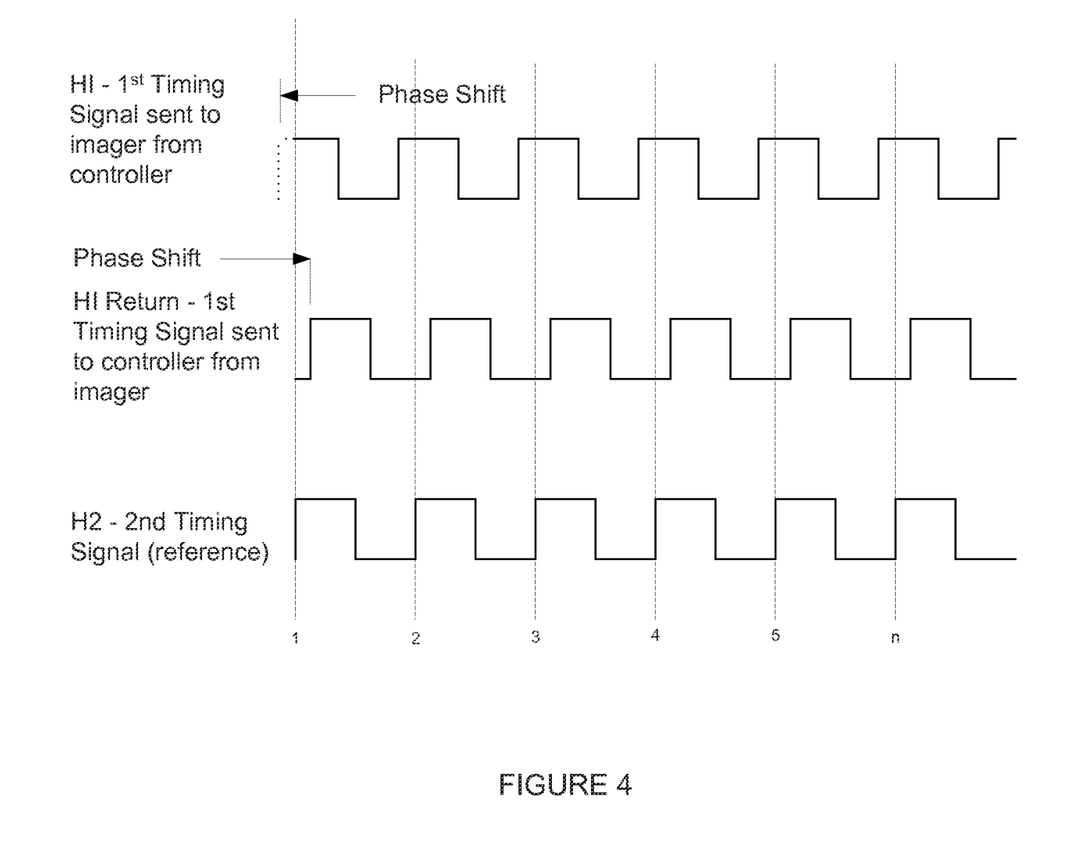
FIG. 4 is a graph according to FIG. 3.
Figure 5:
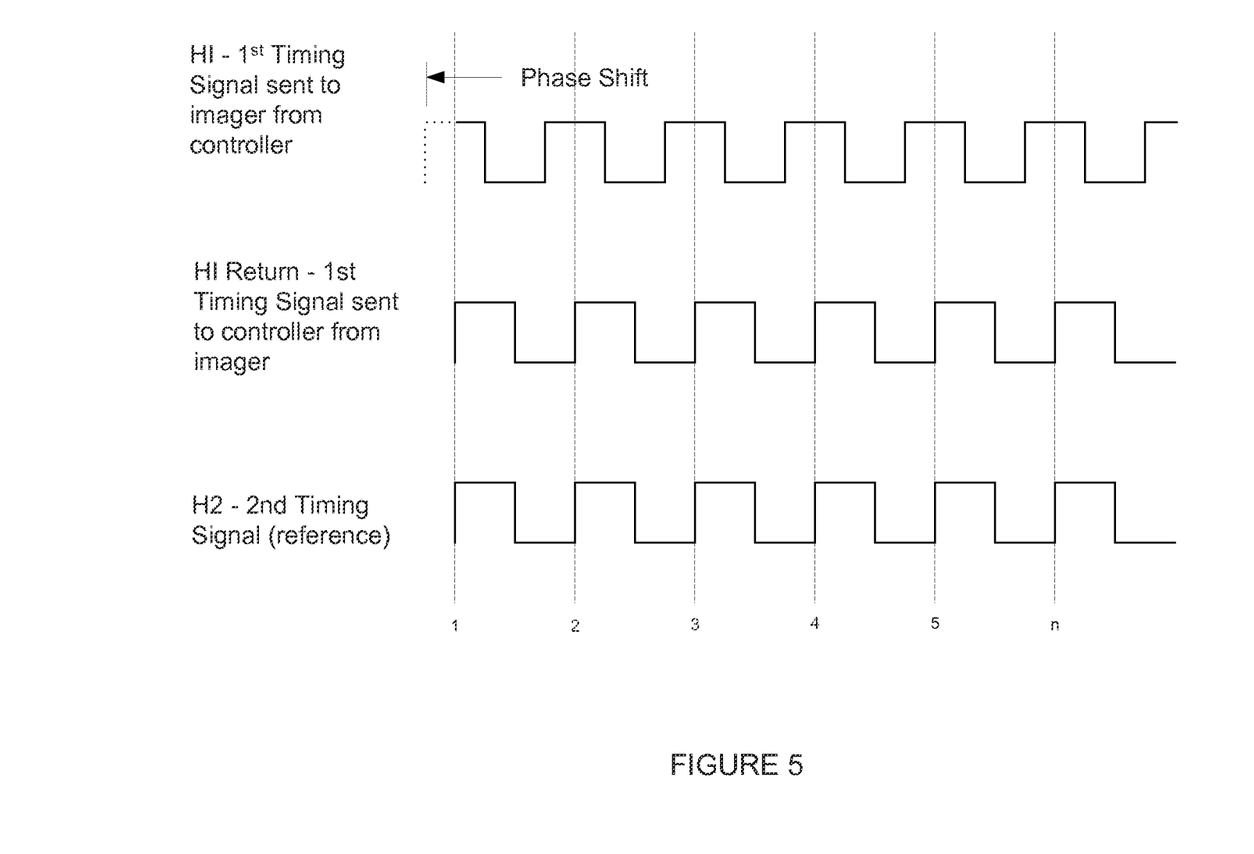
FIG. 5 is a graph according to FIG. 4.

Reference can be made to FIGS. 3-5 illustrating the various phase relationships of the timing signals. The phase detector 204 output may comprise an FPGA input, which is high when the phase of the H1 return is retarded with respect to the ideal (H2), and low when advanced with respect to the ideal. Therefore the phase of the H1 clock is advanced or retarded by writing to a register in the AFE/ADC 202 according to whether the H1 phase detector (pd) output is high or low.

Each time the system monitors the phase detector 204 output the system "looks" to ensure that 64 successive samples all agree (either all low or all high). If the samples do not all agree, then H1 return is presumed to be very close to the ideal, so there is no need to make an adjustment, which causes the mode transition from SAMPLE to IDLE in the pixel sync state machine/device 218.

If pixel sync state machine/device 218 starts when H1 return is rather far from the ideal (H2)—see FIG. 3; for example, 10 counts (a count is ¹⁄₆₄th of a pixel, as determined by the AFE/ADC 202), and H1 return is advanced, the value in reg_30_copy is incremented and written out—see FIG. 4. Afterward, the pixel sync state machine/device 218 reads another 64 samples of the phase detector 204 output, in which all samples agree (all still low), increments the value in reg-30-copy and writes again, which advances the pixel clock (H1) phase. This repeats until the phase detector 204 output transitions from low to high—see FIG. 5. The next pixel clock (H1) phase sampling and adjustment will occur at line three of the next frame.

If pixel sync state machine/device 218 starts when H1 return is several counts retarded, reg_30_copy is decremented until phase detector 204 output transitions low. In this case we follow with one more operation, incrementing and writing out so that phase detector 204 output goes back high. Accordingly, in one advantageous embodiment, the system always ends with phase detector 204 output "high."

More typically, at the beginning of line three (during non-horizontally-blanked portions) we see phase detector 204 output "high" due to the fact that is where it was left during the previous frame, and one additional decrement is performed to make phase detector 204 output "low", then one additional increment in performed to complete the cycle. This is the usual sequence once the loop has been running for a frame or two. The system (i.e. the phase detector 204 output) ends "high" to guarantee that the timing (e.g., the points in time where the analog video waveform is actually sampled) is consistent. For example, it is possible that an "ideal" synchronization may reside at 12.4 ns from a reference point relative to what the CCD considers the pixel boundary. A problem occurs if the timing can only be set in multiples of nanoseconds. Therefore, a decision would have to be made as to whether 12 ns or 13 ns is appropriate (e.g., how to tell the difference between 12.1 ns and 12.9 ns).

Accordingly, in one advantageous embodiment, a convention is utilized that when the ideal point is known to reside between n and n+1, the system selects n+1. It should be understood that one implementation might leave the point at 12 when arriving from above, but at 13 when arriving from below. This makes the timing dependent on the timing starting point, potentially making the image also dependent. Accordingly, after the system has converged, the system dithers on purpose to verify that things haven't changed since the last sample and adjustment process was executed. For example, assume "ideal" is equal to 12.4 ns and the last time the system arrived at 13 ns; periodically (during vertical blanking) the system is set back to 12 ns, the system verifies that phase detector 204 output goes to the opposite state, and then puts the system back to 13 ns (which is also known as "dither").

Black Flickering Problem.

It turns out to be very difficult to keep the pixel sync state machine/device 218 from jittering under all conditions. In particular, if the phase detector 204 output is jittering, the existing detector and FPGA might determine that it wants to be in one position (as defined by the value in the AFE/ADC's 203 register) on one frame and an adjacent position in the next frame. This could alternate with a 50/50 chance that a given frame has the same setting as the previous one. To minimize this issue, the system monitors 64 successive samples before making the determination that the system should adjust the pixel clock (H1) phase. However, it should be noted that the jittering phase detector 204 output is not uniformly likely to jitter across an entire frame.

To address this issue, an extra check to search for jittering (lines 330 to 480 of the previous 500 frames) is performed. If jittering is detected on those lines during any of the previous 500 frames, the loop will not run on the current frame. Since this method waits for a number of frames to pass, the software will write in a register 1-2 seconds after power-up and whenever a new imager 102 is detected so that the system does the initial calibration before going into this other mode waiting for 500 frames.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An imaging system comprising:
   an imager generating image data;
   a control unit connected to said imager, said control unit including:
      a timing generator generating a timing signal;
      a video processor for processing the image data;
      a signal delay compensation circuit having:
         an analog front end circuit generating a first timing signal and a second timing signal where the first and second timing signals each have either a high signal state or a low signal state, and where the first timing signal is sent to said imager and the image data is transmitted to said analog front end circuit;
         a phase detection circuit coupled to said analog front end circuit and receiving the second timing signal;
      said phase detection circuit coupled to said imager and receiving the first timing signal transmitted from said imager;
      said phase detection circuit making a plurality of comparisons between the signal state of the first timing signal received from said imager to the signal state of said second timing signal;
   wherein if the signal state of the first timing signal is out of phase with the signal state of the second timing signal during the plurality of comparisons, the signal delay compensation circuit modifies the phase of the first timing signal; and
   wherein if the signal state for the first timing signal is in phase with the signal state of the second timing signal during the plurality of comparisons, the signal delay compensation circuit does not modify the phase of the first timing signal.

2. The imaging system according to claim 1, wherein the second timing signal serves as a reference, and if the signal state of the first timing signal is always out of phase relative to the second timing signal, the signal delay compensation circuit changes the phase of the first timing signal by retarding or advancing the signal phase.

3. The imaging system according to claim 2 wherein if the signal state comparison always results in the output state of the phase detection circuit being high said signal delay compensation circuit changes the signal state of said first timing signal by advancing the signal phase.

4. The imaging system according to claim 2, wherein if the signal state comparison always results in the output state of the phase detection circuit being low, said signal delay compensation circuit changes the signal state of said first timing signal by retarding the signal phase.

5. The imaging system according to claim 2, wherein if the signal state comparison results in the output state of the phase detection circuit changing between high and low, said signal delay compensation circuit does not retard or advance the phase of the first timing signal.

6. The imaging system according to claim 2, wherein said signal delay compensation circuit further comprises a pixel sync state device coupled to said phase detection circuit, said pixel sync state device receiving an output generated by said phase detection circuit based on the comparison between the first and second timing signals.

7. The imaging system according to claim 6, wherein said pixel sync state device is coupled to said analog front end circuit, wherein if the first timing signal is to be retarded or advanced, said pixel sync state device generates and transmits the retardation or advancement signal to said analog front end circuit.

8. The imaging system according to claim 6, wherein said pixel sync state device and said video processor are integrated into a single chip device.

9. The imaging system according to claim 1, wherein said analog front end circuit further comprises an analog-to-digital converter, and wherein the image data is converted from analog image data to a digital image data.

10. The imaging system according to claim 9, wherein the digital image data is transmitted to said video processor.

11. The imaging system according to claim 1, further comprising an oscillator coupled to said analog front end circuit, said video processor and said timing generator.

12. The imaging system according to claim 1, further comprising a processor coupled to said oscillator, wherein said processor transmits data to said oscillator setting a frequency output by said oscillator based on an identification of said imager.

13. The imaging system according to claim 12, wherein said oscillator outputs a signal with <1 psecond jitter.

14. The imaging system according to claim 12, wherein said signal delay compensation circuit further comprises:
a storage coupled to said analog front end circuit; and
a serial transmit state device coupled to said storage;
wherein said processor writes analog front end data to said storage and said serial transmit state device determines when the analog front end data is transmitted to said analog front end circuit.

15. The imaging system according to claim 14, wherein said storage and said video processor are integrated into a single chip device.

16. The imaging system according to claim 14, wherein said serial transmit state device and said video processor are integrated into a single chip device.

17. The imaging system according to claim 1, wherein said control unit comprises:
an imager module, wherein said timing generator, said video processor and said signal delay compensation circuit are positioned in said imager module; and
a display module having video input circuitry for receiving the image data and video output circuitry for transmitting the image data to a display.

18. The imaging system according to claim 17 wherein said imager module and said display module are detachably coupled to each other.

19. The imaging system according to claim 1, wherein said imager comprises a charge-coupled device (CCD) or a complimentary metal-oxide-semiconductor (CMOS) device.

20. The imaging system according to claim 1 wherein said imager is positioned in a camera head that is detachably coupled to an endoscope.

21. The imaging system according to claim 1 wherein said imager is positioned on a video endoscope.

22. The imaging system according to claim 1, wherein said imager is coupled to said control unit via a cable detachably connected to said control unit.

23. An imaging system comprising:
an imager generating image data;
a control unit connected to said imager, said control unit including:
a signal delay compensation circuit having an analog front end circuit generating a first timing signal and a second timing signal where the first and second timing signals each have either a high signal state or a low signal state, the first timing signal sent to said imager and the image data transmitted to said analog front end circuit;
a phase detection circuit coupled to said analog front end circuit and receiving the second timing signal, which serves as a reference signal;
said phase detection circuit coupled to said imager and receiving said first timing signal transmitted from said imager;
said phase detection circuit making a plurality of comparisons between a signal state of the first timing signal received from said imager to a signal state of said second timing signal;
wherein if the signal state of the first timing signal is out of phase relative to the second timing signal during the plurality of comparisons, the signal delay timing circuit modifies the phase of one of either the first timing signal or the second timing signal by retarding or advancing the signal phase of either the first or the second timing signal; and
wherein if the output signal state of the phase detector alternates between high and low, the signal delay compensation circuit does not modify the phase of either the first timing signal or the second timing signal.

24. The imaging system according to claim 23, wherein said signal delay compensation circuit further comprises a pixel sync state device coupled to said phase detection circuit, said pixel sync state device receiving an output generated by said phase detection circuit based on the comparison between the first and second timing signals.

25. The imaging system according to claim 24, wherein said pixel sync state device is coupled to said analog front end circuit, wherein if the first or the second timing signal is to be retarded or advanced, said pixel sync state device generates and transmits the retard or advance signal to said analog front end circuit.

26. The imaging system according to claim 24, wherein said pixel sync state device and said video processor are integrated into a single chip device.

27. The imaging system according to claim 23, wherein said analog front end circuit further comprises an analog-to-digital converter, and wherein the image data is converted from analog image data to a digital image data.

28. The imaging system according to claim 27, wherein the digital image data is transmitted to a video processor positioned in said control unit.

29. The imaging system according to claim 23, further comprising:

an oscillator coupled to said analog front end circuit;
a timing generator coupled to said analog front end circuit; and
a processor coupled to said oscillator;
wherein said processor transmits data to said oscillator setting a frequency output by said oscillator based on an identification of said imager.

30. The imaging system according to claim 29, wherein said signal delay compensation circuit further comprises:
a storage coupled to said analog front end circuit; and
a serial transmit state device coupled to said storage;
wherein said processor writes analog front end data to said storage and said serial transmit state device determines when the analog front end data is transmitted to said analog front end circuit.

31. The imaging system according to claim 30, wherein said storage and said video processor are integrated into a single chip device.

32. The imaging system according to claim 30, wherein said serial transmit state device and said video processor are integrated into a single chip device.

33. The imaging system according to claim 23 wherein said imager is positioned in a camera head that is detachably coupled to an endoscope.

34. The imaging system according to claim 23 wherein said imager is positioned on a video endoscope.

35. A method for generating image data with an imaging system comprising the steps of:
generating image data with an imager;
connecting the imager to a control unit having a signal delay compensation circuit including an analog front end circuit and a phase detection circuit;
generating a first timing signal with the analog front end circuit;
transmitting the first timing signal from the analog front end circuit to the imager;
transmitting the first timing signal from the imager to the phase detection circuit;
generating a second timing signal with the analog front end circuit;
transmitting the second timing signal from the analog front end circuit to the phase detection circuit, the second timing signal serving as a reference signal;
performing a plurality of comparisons of a phase relationship of the first timing signal to the second timing signal;
wherein if the signal state of the first timing signal is always high or always low relative to the second timing signal during the plurality of comparisons, the method further comprises the steps of: retarding or advancing the signal phase of either the first timing signal or the second timing signal;
wherein if the output signal state of the phase detector alternates between high and low during the plurality of comparisons, neither the first timing signal nor the second timing signal is retarded or advanced.

36. The method according to claim 35, wherein said signal delay compensation circuit includes a pixel sync state device coupled to the phase detection circuit and the analog front end circuit, the method further comprising the steps of:
generating an output by the phase detection circuit based on the comparison between the first and second timing signals;
transmitting the phase detection circuit output from the phase detection circuit to the pixel sync state device;
generating an output by the pixel sync state device;
transmitting the pixel sync state device output to the analog front end circuit; and
retarding or advancing either the first timing signal or the second based on the pixel sync state device output.

37. The method according to claim 35, wherein said analog front end circuit further includes an analog-to-digital converter, and the method further comprises the steps of:
converting the image data from analog image data to a digital image data; and
transmitting the digital image data to a video processor.

38. The method according to claim 35, wherein the imager is associated with an endoscope, the method further comprising the steps of:
identifying the imager when the endoscope is attached to the control unit;
transmitting a frequency signal to an oscillator positioned in the control unit, the frequency signal selected based on the identification of the connected imager;
generating an oscillation signal with the oscillator, the oscillation signal based on the received frequency signal; and
transmitting the oscillation signal from the oscillator to the analog front end circuit;
wherein the first and second timing signals are based at least in part on the oscillation signal.

39. The method according to claim 35, wherein said image data is transmitted in a series of lines and wherein the retarding or advancing of the signal phase of either the first or the second timing signal occurs during non-horizontally-blanked portions of the series of lines.

* * * * *